(12) United States Patent
Sugimoto

(10) Patent No.: US 6,859,216 B2
(45) Date of Patent: Feb. 22, 2005

(54) INPUT DATA PROCESSING DEVICE, DATA PROCESSING METHOD AND COMPUTER PROGRAM PRODUCT EXCELLENT IN GRAPHICAL USER INTERFACE FUNCTION AND VERSATILITY

(75) Inventor: Tetsuya Sugimoto, Muko (JP)

(73) Assignee: Minolta Co., Ltd., Osaka (JP)

( * ) Notice: Subject to any disclaimer, the term of this patent is extended or adjusted under 35 U.S.C. 154(b) by 242 days.

(21) Appl. No.: 10/051,055

(22) Filed: Jan. 22, 2002

(65) Prior Publication Data

US 2002/0122074 A1 Sep. 5, 2002

(30) Foreign Application Priority Data

Jan. 24, 2001 (JP) .................................. 2001-015288
Nov. 26, 2001 (JP) .................................. 2001-359841

(51) Int. Cl.[7] ............................................. G09G 5/00
(52) U.S. Cl. ..................... 345/839; 345/173; 345/530
(58) Field of Search ...................... 345/157, 160–163, 345/167, 173, 179–184, 530, 545, 839; 358/1.16, 1.17

(56) References Cited

U.S. PATENT DOCUMENTS 5,045,880 A * 9/1991 Evanitsky et al. ............. 399/82
5,534,917 A * 7/1996 MacDougall ................. 348/169
5,732,222 A * 3/1998 Miyagawa et al. ........... 705/12
6,498,658 B1 * 12/2002 Sekikawa .................. 358/1.16
2002/0030838 A1 * 3/2002 Toyama et al. ............. 358/1.13

FOREIGN PATENT DOCUMENTS

JP 11-065780 3/1999
JP 2000-293333 10/2000

* cited by examiner

*Primary Examiner*—Amare Mengistu
*Assistant Examiner*—Tom Sheng
(74) *Attorney, Agent, or Firm*—Burns, Doane, Swecker & Mathis, L.L.P.

(57) ABSTRACT

An input data processing device adaptable flexibly to any change of an input screen includes a display unit displaying structural drawing data showing a plurality of input regions representing a range of acceptable inputs of designation, the designation being made for controlling an image forming apparatus, and further includes a memory unit storing bit map data which corresponds to the structural drawing data and includes data corresponding to respective positions of the input regions to which different values are assigned respectively, a position detecting portion for detecting a position designated on the display unit on which the structural drawing data is displayed, and a data output portion outputting, according to the bit map data, a value corresponding to the designated position detected by the position detecting portion.

21 Claims, 5 Drawing Sheets

| PIXEL VALUE | COMPONENTS |
|---|---|
| 0 | NONE |
| 1 | A4 TRAY |
| 2 | B4 TRAY |
| 3 | B5 TRAY |

FIG. 5

| PIXEL VALUE | COMPONENTS |
|---|---|
| 0 | NONE |
| 1 | A4 TRAY |
| 2 | B4 TRAY |
| 3 | B5 TRAY |
| 4 | STACK |
| 5 | A3 TRAY |
| ⋮ | ⋮ |
| 15 | |

INPUT DATA PROCESSING DEVICE, DATA PROCESSING METHOD AND COMPUTER PROGRAM PRODUCT EXCELLENT IN GRAPHICAL USER INTERFACE FUNCTION AND VERSATILITY

This application is based on applications Nos. 2001-15288 and 2001-359841 filed in Japan, the contents of which are hereby incorporated by reference.

BACKGROUND OF THE INVENTION

1. Field of the Invention

The present invention relates to input data processing devices, data processing methods and computer program products. In particular, the invention relates to an input data processing device, a data processing method and a computer program product excellent in graphical user interface function and versatility.

2. Description of the Related Art

Printer drivers have conventionally used a graphical user interface (hereinafter "GUI") for allowing a user to enter a predetermined command. Such printer drivers having the graphical user interface presents, to a user, a structural drawing of printer hardware so as to enable the user to select a desired function from the structural drawing. For example, the user can select a desired paper type by merely indicating any tray, which holds sheets of the desired paper type, on the structural drawing.

This GUI detects which part of the structural drawing on a display is indicated by the user, by comparing coordinate information on the indicated position on the display and the structural drawing of the printer to determine a relation between the indicated position on the display and the corresponding position on the structural drawing.

However, printers of different models have respective component structures different from each other so that respective structural drawings of the printers to be displayed are not the same. Then, development of printer drivers has been required to establish, for each printer model, a relation between coordinate information on indicated positions on the display and the structural drawing of the printer. In other words, for each printer model, data must newly be prepared that shows a relation between coordinate data and a printer structure, which results in an inconvenience that, each time a new printer model is produced, data adapted to the new printer model must newly be prepared. In order to prepare such data, it is necessary to input which region of the coordinate system corresponds to which component of a printer, for example paper supply tray, for each region of the coordinate system. In particular, if the printer has a great number of components or the coordinate system includes complicated regions, preparation of such data is considerably troublesome.

SUMMARY OF THE INVENTION

The present invention has been made to solve the above-described problem. One object of the present invention is to provide an input data processing device, an input data processing method and an input data processing program adaptable flexibly to any change of an input screen.

According to one aspect of the present invention, an input data processing device includes a display unit displaying display image data showing a plurality of input regions representing a range of acceptable inputs of designation, the designation being made for controlling a predetermined apparatus, a memory unit storing bit map data corresponding to the display image data, the bit map data including data corresponding to respective positions of the input regions to which different values are assigned respectively, a position detecting portion for detecting a position designated on the display unit on which the display image data is displayed, and an output portion for outputting a value corresponding to the designated position detected by the position detecting portion, according to the bit map data.

According to the present invention, a position designated on the display unit is detected and then a value corresponding to the designated position is output according to the bit map data. The bit map data corresponds to the display image data, and includes data corresponding to respective positions of the input regions to which different values are assigned respectively. Even if the display image data is changed, it is merely required that the bit map data is changed according to the change of the display image data. The input data processing device can thus be provided that is adaptable flexibly to a change of an input screen.

According to another aspect of the present invention, a data processing method includes the steps of displaying, on a display unit, an image showing a plurality of input regions representing a range of acceptable inputs of designation, the designation being made for controlling a predetermined apparatus, detecting a position designated by a user on the image displayed on the display unit, referring to the designated position having been detected and to bit map data having different values assigned respectively to positions to be designated, and outputting a value corresponding to the designated position having been detected, according to the bit map data.

According to the present invention, a position designated by a user on the image displayed on the display unit is detected, then a reference is made to the designated position and to the bit map data having different values assigned respectively to positions to be designated, and thus a value corresponding to the designated position having been detected is output. Even if the image showing a plurality of input regions displayed on the display unit is changed, a predetermined value can be output by merely changing the bit map data according to the change of the image on the display unit. Accordingly, the data processing method can be provided adaptable flexibly to a change of the input screen.

According to a still another aspect of the present invention, a computer program product for executing an input data process by a computer is provided. The computer executes the process steps of displaying, on a display unit, an image showing a plurality of input regions representing a range of acceptable inputs of designation, the designation being made for controlling a predetermined apparatus, detecting a position designated by a user on the image displayed on the display unit, referring to the designated position having been detected and to bit map data having different values assigned respectively to positions to be designated, and outputting a value corresponding to the designated position having been detected, according to the bit map data.

According to the present invention, even if the image showing a plurality of input regions displayed on the display unit is changed, a predetermined value can be output by merely changing the bit map data according to the change of the image. Then, the computer program product can be provided adaptable flexibly to a change of the input screen.

The computer program product refers to a concept including a computer program itself and a computer-readable recording medium on which a computer program is recorded.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described in conjunction with the drawings. It is noted that the same or corresponding components are denoted by the same reference character and description thereof is not repeated here.

Figure 1:
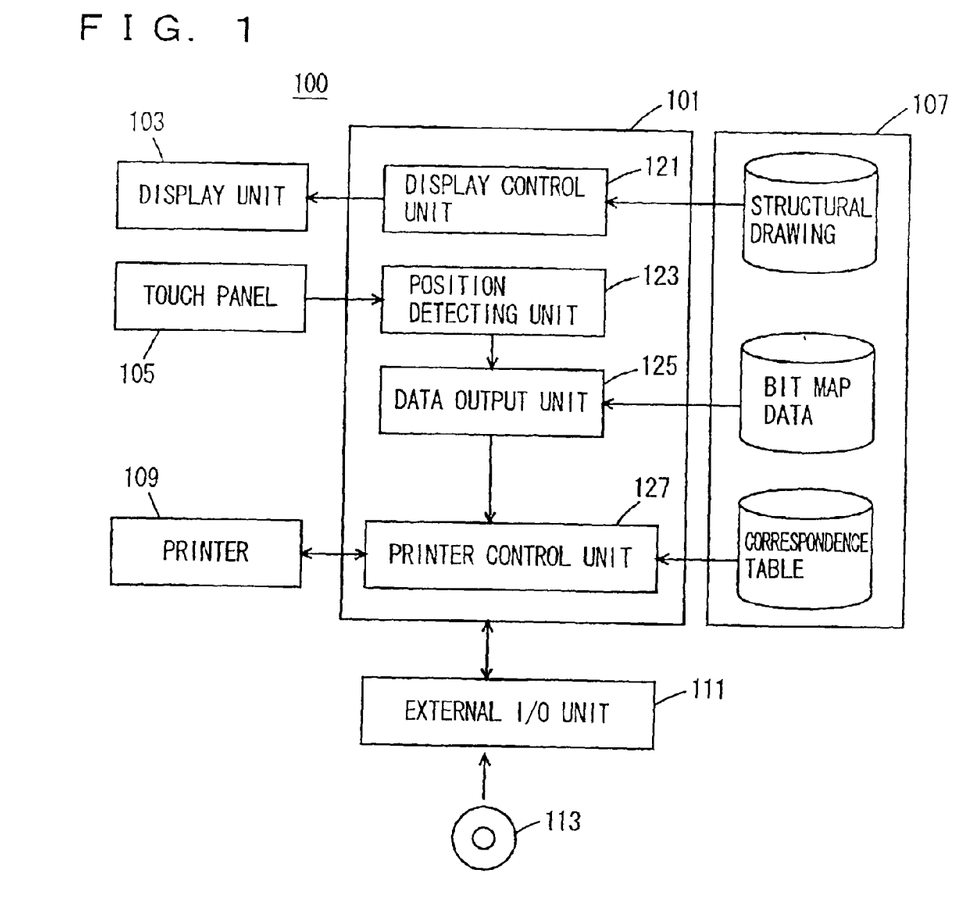
FIG. 1 is a schematic block diagram showing a structure of an input data processing device according to one embodiment of the present invention.

FIG. 1 is a schematic block diagram showing a structure of an input data processing device according to one embodiment of the present invention. Here, a printer is connected to a personal computer in which a printer driver is installed. Referring to FIG. 1, the input data processing device 100 includes a control unit 101 for controlling the whole of input data processing device 100, a display unit 103 such as liquid crystal display and CRT (cathode ray tube) connected to control unit 101 for displaying predetermined information, a touch panel 105 provided on display unit 103, a printer 109 connected to control unit 101 for printing predetermined information, and a memory unit 107. Control unit 101 of this embodiment is constituted of a personal computer, for example.

Control unit 101 includes a display control unit 121 for controlling display unit 103, a position detecting unit 123 for detecting positional information supplied from touch panel 105, a data output unit 125 for outputting data corresponding to the position detected by position detecting unit 123, and a printer control unit 127 for controlling printer 109.

Memory unit 107 stores image data representing a structural drawing of printer 109 that is shown on display unit 103, bit map data which is image data corresponding to positions on the structural drawing and is specifically pixel data on respective positions to which predetermined values are assigned respectively, and a correspondence table where the pixel values of the bit map data are correlated to corresponding printer components. The structural drawing and bit map data are bit maps corresponding to pixels of display unit 103, and detailed description thereof is given later.

Touch panel 105 made of a transparent material is formed of switches that is appropriately positioned on a surface of display unit 103. Touch panel 105 detects the coordinate of any position on display unit 103 that is pressed and accordingly transmits corresponding coordinate data of the pressed position to position detecting unit 123.

Display control unit 121 reads the image data of the structural drawing stored in memory unit 107 to display the image data on display unit 103. Position detecting unit 123 detects the coordinate from the data supplied from touch panel 105 to transmit the detected coordinate to data output unit 125.

Data output unit 125 uses the bit map data stored in memory unit 107 for deriving a value, from the bit map data, that corresponds to the position (coordinate) detected by position detecting unit 123, and then transmits the value to printer control unit 127. Printer control unit 127 thus receives the value to control printer 109 which accordingly operates based on a received signal.

Control unit 101 is connected to an external input/output unit 111. External input/output unit 111 is, for example, a magneto-optical disk drive or DVD (Digital Versatile Disk) drive for reading an input data processing program recorded on a recording medium 113 that is executed by control unit 101.

Here, a computer program product refers to a concept including a computer program itself and a computer-readable recording medium on which the computer program is recorded.

Recording medium 113 may be any of tape media such as magnetic tape and cassette tape, disk media such as magnetic disk (flexible disk, hard disk) and optical disk (CD-ROM, MO (Magneto-Optical) disk, MD (Mini Disk), DVD (Digital Versatile Disk)), card media such as IC card (including memory card) and optical card, and a medium fixedly holding a program like semiconductor memories such as mask ROM, EPROM, EEPROM and flash memory. Alternatively, recording medium 113 may be a medium holding a program in a non-fixed manner so as to allow the program to be downloaded from a network. External input/output unit 111 is adapted to recording medium 113 so that information can be read from or written into such recording medium 113.

Figure 2:
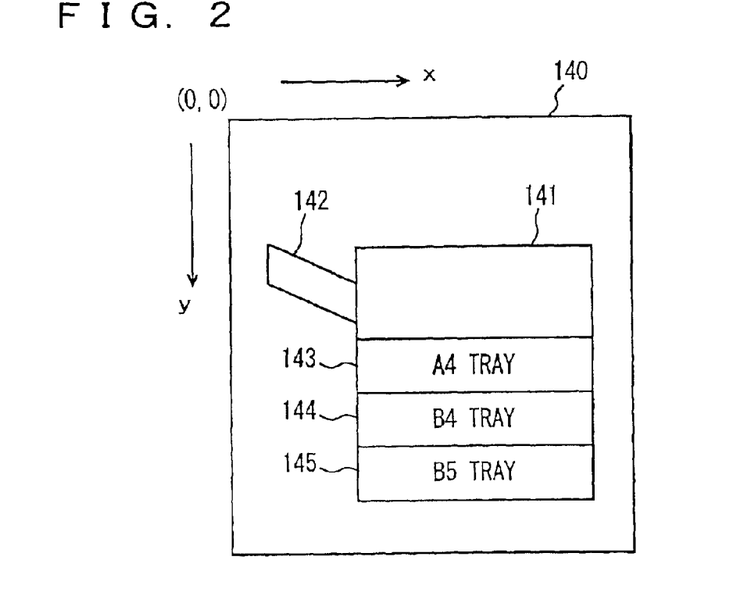
FIG. 2 shows an exemplary structural drawing stored in a memory unit of the input data processing device according to this embodiment.
Figure 3:
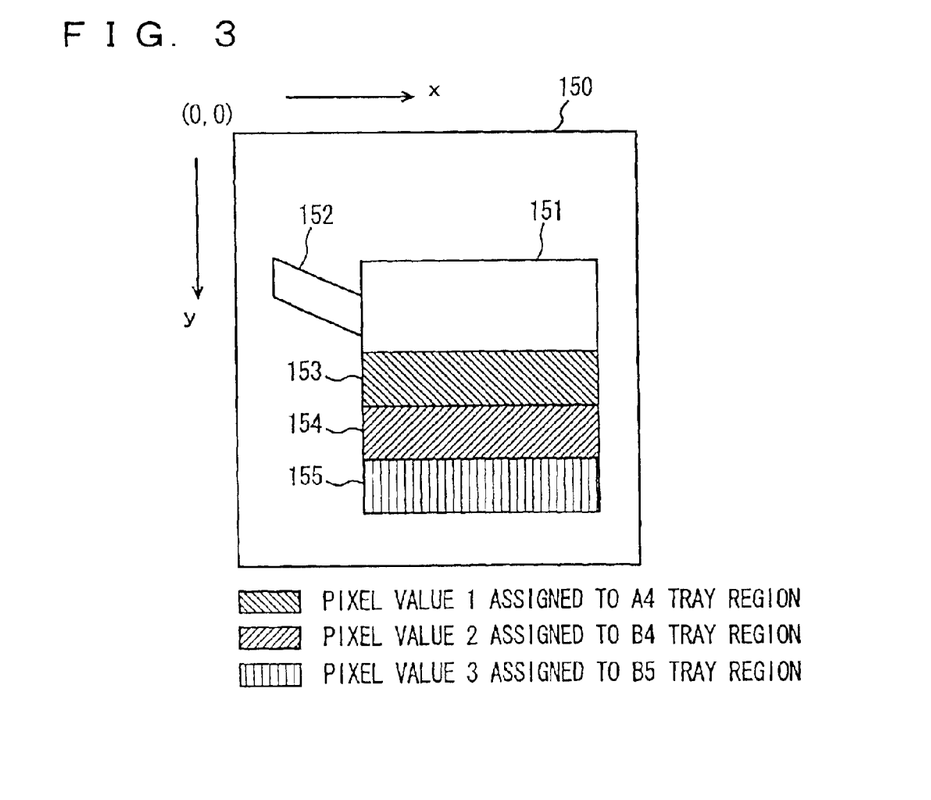
FIG. 3 shows exemplary bit map data stored in the memory unit of the input data processing device according to this embodiment.

FIG. 2 shows one example of the structural drawing stored in memory unit 107 of input data processing device 100 according to this embodiment. FIG. 3 shows one example of the bit map data stored in memory unit 107 of input data processing device 100 of this embodiment.

Referring to FIG. 2, the structural drawing 140 is a bit map with positions represented by a coordinate system having its origin at the upper left corner, x-axis in the horizontal direction and y-axis in the vertical direction. The positive direction of the x-axis is the rightward direction and the positive direction of the y-axis is the downward direction. The structural drawing shows respective shapes of printer components illustrated within a predetermined range. A general view 141 of printer 109 is illustrated on structural drawing 140, and, in general view 141, there are shown an A4 tray 143 holding sheets of A4 size, a B4 tray 144 holding B4 sheets and B5 tray 145 holding B5 sheets. Moreover, a stack 142 is shown that is an exit to which sheets are discharged. A4 tray 143, B4 tray 144, B5 tray 145 and stack 142 correspond to respective regions where a user enters a command.

Structural drawing 140 thus provides data represented by the bit map showing respective shapes of printer components. The data is image data displayed on display unit 103 to show the components to a user.

FIG. 3 is an example of the bit map data stored in memory unit 107 in input data processing device 100 according to this embodiment. The bit map data 150 corresponds to a bit map prepared according to structural drawing 140. Different data are assigned to respective regions corresponding respectively to the regions of printer components shown on structural drawing 140.

Referring to FIG. 3, in the bit map of bit map data 150, different data are assigned to respective regions corresponding respectively to the shapes of components in general view 141 of the printer shown on structural drawing 140 in FIG. 2. It is assumed here that data of 4 bits is assigned to one pixel for example. Then, sixteen levels from 0 to 15 can be represented. Specifically, "1" is assigned to pixels of a region 153 corresponding to A4 tray 143 of structural drawing 140, "2" is assigned to pixels of a region 154 corresponding to B4 tray 144, "3" is assigned to pixels of a region 155 corresponding to B5 tray 145, and "4" is assigned to pixels of a region 152 corresponding to stack 142 of structural drawing 140. Further, "0" is assigned to pixels other than those of regions 153, 154, 155 and 152 of bit map data 150.

The input regions shown on structural drawing 140 match respective regions to which corresponding data are assigned on bit map data 150 in the example shown in FIG. 3.

In bit map data 150 representing the map corresponding to structural drawing 140, multi-value pixel data can be stored. The pixel value of each pixel is determined according to any region in which that pixel is included. This region corresponds to any of the regions shown on structural drawing 140.

In other words, bit map data 150 provides a map defined to have regions of the same arrangement as that of the regions of structural drawing 140, and, this map assigns different values to respective components of the printer.

The correspondence table stored in memory unit 107 correlates the printer components with corresponding pixel values of bit map data 150 and stores the correspondence therein. For example, the A4, B4 and B5 trays are correlated respectively with pixel values "1", "2" and "3".

Accordingly, it is possible to determine which component of the printer is designated on structural drawing 140 by referring to the correspondence table for deriving therefrom the pixel value of coordinate on bit map data 150 that corresponds to the coordinate specified on structural drawing 140.

Figure 4:
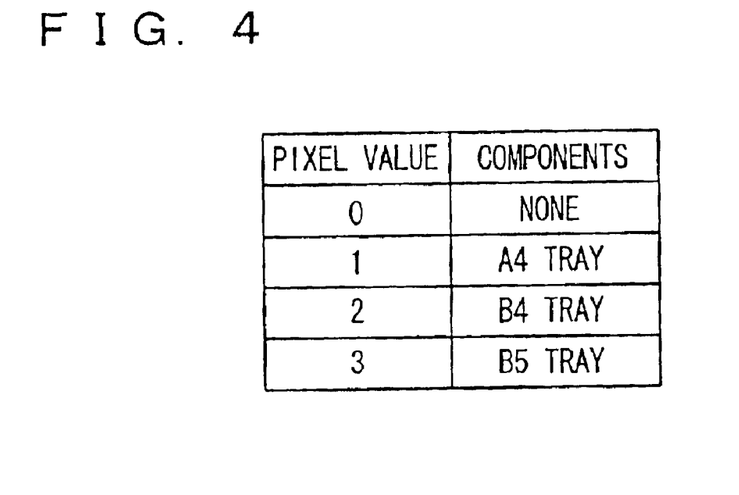
FIGS. 4 and 5 show exemplary correspondence tables stored in the memory unit of the input data processing device according to this embodiment.

Regardless of the model of printer, the correlation between all components of the printer and corresponding pixel values may be defined in advance. Then, the correspondence table of each printer model may accordingly store any correspondence between components and respective pixel values necessary for that printer. FIG. 4 shows one example of such a correspondence table stored in memory unit 107 of input data processing device 100 according to this embodiment. In the correspondence table shown in FIG. 4, each pixel value of the bit map data shown in FIG. 3 is defined. The correspondence in this table is defined in advance regardless of the printer model and the table includes only the correspondence necessary for printer 109.

A correspondence table can be prepared in which all components are correlated with corresponding pixel values so that this correspondence table is used commonly regardless of the printer model. Then, it is unnecessary to prepare a correspondence table for each printer model.

Figure 5:
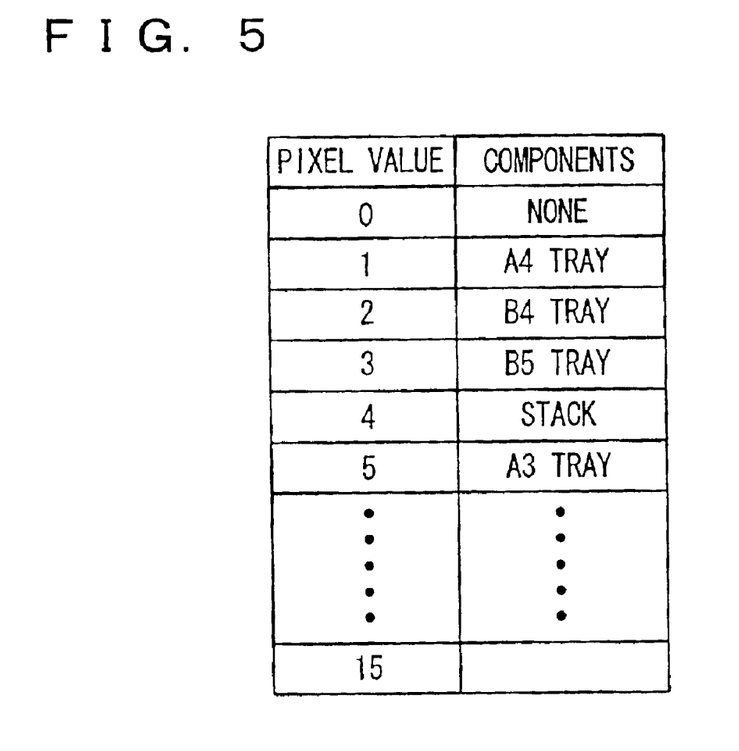

FIG. 5 shows one example of such a correspondence table which is used commonly regardless of printer model and in which printer components are correlated with corresponding pixel values regardless of printer model. Referring to FIG. 5, pixel value "0" is correlated with no component, pixel value "1" is correlated with an A4 tray, pixel value "2" is correlated with a B4 tray, pixel value "3" is correlated with a B5 tray, pixel value "4" is correlated with a stack, and pixel value "5" is correlated with an A3 tray. If the pixel value of 4 bits is used, pixel values "6" to "15" can be correlated with other printer components. In the correspondence table shown in FIG. 5, pixel values and corresponding printer components are correlated regardless of the printer model, and this correspondence table is commonly used by printers of different models. For example, if a printer different in structure from printer 109 is connected, the correspondence table shown in FIG. 5 is employed.

Alternatively, a correspondence table may be prepared for each printer model. In this correspondence table unique to the printer model, components necessary for each printer model are correlated with respective pixel values. In this case, correspondence tables of the same number as that of printer models must be prepared. Bit map data 150 is one of bit map data corresponding to structural drawing 140 shown in FIG. 2. Thus, a plurality of bit map data may be provided for one printer, i.e., one structural drawing 140. A plurality of bit map data can be provided for one structural drawing so that the number of selectable printer components is limited for accepting an input designating any of such components only and thus unnecessary components are eliminated from selection. For example, bit map data to be used for selecting sheet size and bit map data to be used for selecting any location where sheets are discharged are separately provided for structural drawing 140 shown in FIG. 2. The bit map data used for selecting sheet size is a bit map in which pixel values are assigned to corresponding regions of sheet-holding trays only. The bit map data used for selecting discharge location is a bit map in which pixel values are assigned to corresponding stacks or sorters only where sheets are discharged. In this way, the number of selectable components can be limited by providing a plurality of bit map data for one printer model and changing the bit map data according to components to be designated.

Figure 6:
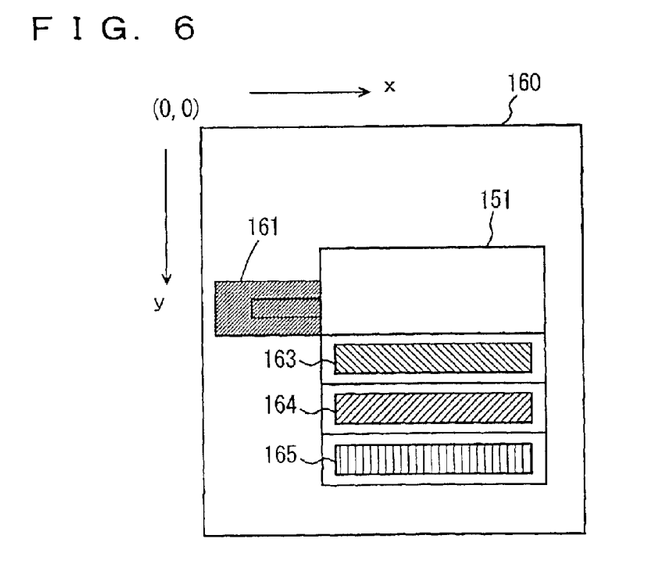
FIG. 6 shows another example of the bit map data.

FIG. 6 shows another example of the bit map data. Referring to FIG. 6, bit map data 160 is a bit map in which pixel values are assigned to corresponding regions respectively that are larger or smaller than those regions of respective components in general view 141 of the printer illustrated in structural drawing 140 shown in FIG. 2.

For example, a region 161 is larger than the region of stack 142 in structural drawing 140 and pixel value "4" is assigned to region 161, in order to provide larger region 161 on bit map data 160 than the actual region on the structural drawing since the area of the region of stack 142 is small on the structural drawing, for example. Then, the region 161 can readily be designated.

In addition, a region 163 on bit map data 160 is smaller than the corresponding A4 tray 143 on structural drawing 140. Similarly, a region 164 is smaller than the corresponding B4 tray 144 and a region 165 is smaller than the corresponding B5 tray 145. Then, respective boundaries between A4 tray 143 and B4 tray 144 and between B4 tray 144 and B5 tray 145 can be clarified. Accordingly, it is possible to prevent any region from being selected incorrectly.

Figure 7:
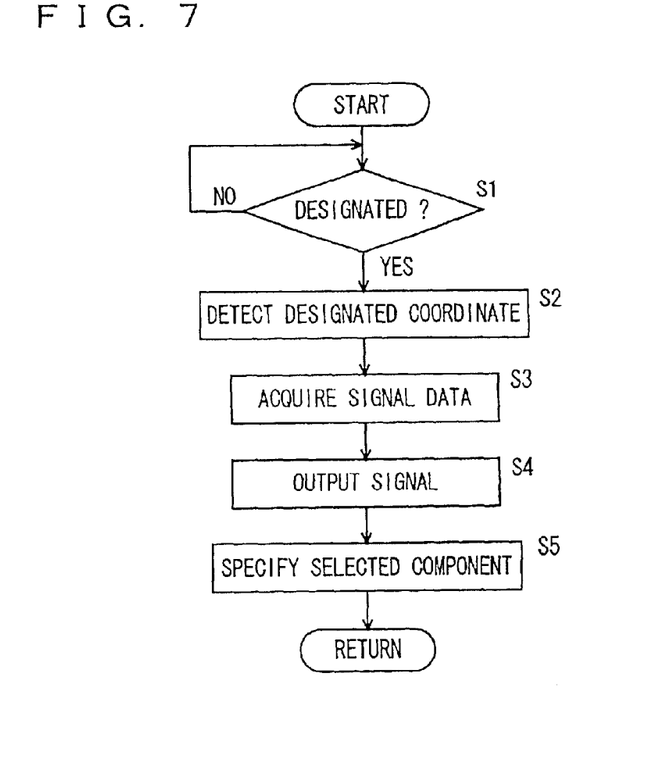
FIG. 7 is a flowchart illustrating a flow of a data input process executed by the input data processing device according to this embodiment.

FIG. 7 is a flowchart illustrating a flow of a data input process executed by the input data processing device of this embodiment. It is assumed here that memory unit 107 of input data processing device 100 stores the image data of structural drawing 140 shown in FIG. 2 and the bit map data shown in FIG. 3. The flow is described accordingly.

Referring to FIG. 7, it is determined whether or not a signal is input from touch panel 105 to the control unit (position detecting unit) (step S1). The signal supplied from touch panel 105 to the control unit (position detecting unit) represents coordinate data on the entire display unit. When a user presses touch panel 105 with any finger for example, the signal is output from touch panel 105. Instead of touch panel 105, any pointing device such as mouse may be used. From the position of the mouse pointer shown on display unit 103 when the mouse is clicked, a designated coordinate is detected. Touch panel 105 is unnecessary if the pointing device is employed.

Position detecting unit 123 thus receives the signal from touch panel 105 to detect the coordinate on structural drawing 140 that is designated by means of touch panel 105 (step S2).

The value of designated coordinate thus detected is supplied to data output unit 125. Then, from memory unit 107, data output unit 125 reads and refers to bit map data 150 corresponding to structural drawing 140 shown on display unit 103 (step S3). Data out put unit 125 accordingly reads the pixel value on the read bit map data that corresponds to the coordinate supplied from position detecting unit 123, and provides the pixel value to printer control unit 127 (step S4).

Printer control unit 127 refers to the correspondence table stored in memory unit 107 based on the pixel value supplied from data output unit 125, and determines a printer component corresponding to the supplied signal (step S5). If the pixel value is "1", it is determined that A4 tray 143 is designated. If the pixel value is "2", it is determined that B4 tray 144 is selected. If the pixel value is "3", it is determined that B5 tray 145 is selected.

The selected component is thus specified and a command is transmitted to printer 109 according to the selected component so as to control printer 109.

As discussed above, the input data processing device of this embodiment has the bit map data corresponding to the image data of the structural drawing, and a designated printer component is determined in accordance with the pixel value of the position corresponding to the designated position on the bit map data. Then, in the development of printer drivers, if a change is made in the printer model or a new printer is produced which accompanies a change in the structure of a printer, flexible adaptation to such a change in printer structure is possible merely by change of data on the structural drawing, bit map data and correspondence table if necessary, according to the printer of different structure. The bit map data corresponds to the structural drawing of the printer. Then, it is just required to prepare bit map data in which pixel values are assigned to corresponding regions of respective components. Although a complicated work has been required in order to input, for each region, coordinate data representing the corresponding region, such a troublesome work is unnecessary in this embodiment.

In other words, the region of each printer component is designated not by the coordinate but by the pixel value on the bit map data. Then, adaptation to a structure of a complicated shape other than rectangle is easily accomplished. Consequently, reduction is achieved in the cost and time for development of a program.

In addition, although this embodiment has been described by being applied to the printer driver, the embodiment is applicable not only to printers but also to user interface of software used for control or setting of such equipment as printer with scanner and facsimile. Moreover, the embodiment is applicable to an operation panel on the basis of the patch panel system that is provided to an image forming apparatus like printer, facsimile and copier. Further, this embodiment is not limited to designation of a component of the equipment mentioned above, and is applicable to various graphical user interfaces such as a system for displaying information concerning a region designated on a map, designation of a button on a menu screen, and the like.

Figure 8:
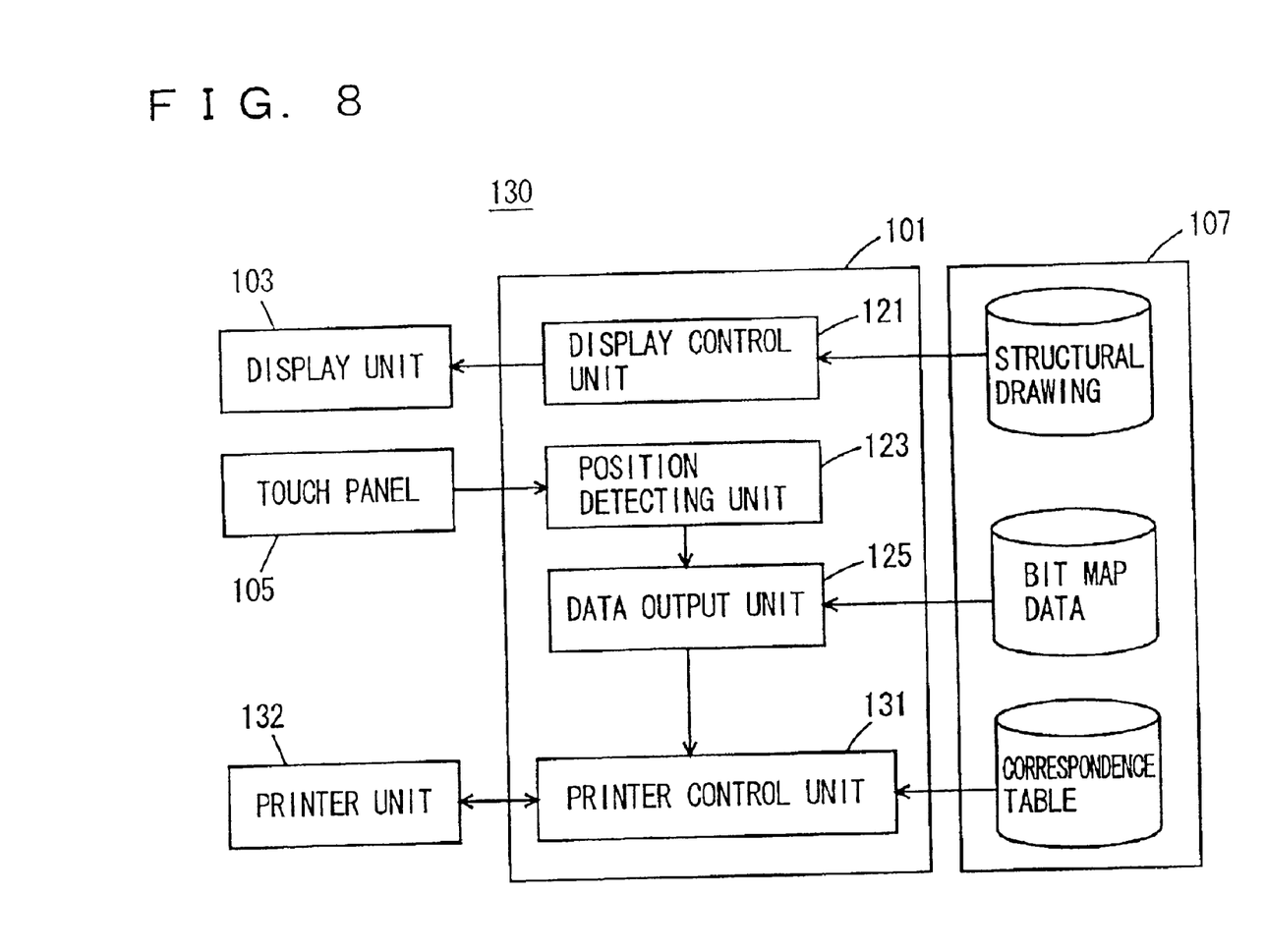
FIG. 8 schematically shows a structure of the input data processing device of this embodiment applied to a printer.

FIG. 8 schematically shows a structure of input data processing device 100 of this embodiment applied to a printer. Those components common to FIGS. 8 and 1 are denoted by the same reference character, they are referred to by the same name and have the same function, and detailed description thereof is not repeated here.

Referring to FIG. 8, a printer 130 includes a control unit 101 for controlling the whole of printer 130, a display unit 103 connected to control unit 101 for displaying predetermined information, a touch panel 105 provided on display unit 103, a printer control unit 131 connected to control unit 101, a printer unit 132 connected to printer control unit 131, and a memory unit 107.

Printer unit 132 forms an image on a recording medium such as a sheet of paper. Printer control unit 131 controls printer unit 132. The present invention is thus applicable to a user interface of software for setting and control of the printer by structuring printer 130 as described above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An input data processing device comprising:
   a display unit displaying display image data showing a plurality of input regions representing a range of acceptable inputs of designation, said designation being made for controlling a predetermined apparatus;
   a memory unit storing bit map data corresponding to said display image data, said bit map data including data corresponding to respective positions of said plurality of input regions to which different values are assigned respectively;
   a position detecting portion for detecting a position designated on said display unit on which said display image data is displayed; and
   an output portion for outputting the value corresponding to the designated position detected by said position detecting portion, according to said bit map data.

2. The input data processing device according to claim 1, wherein for one piece of said predetermined apparatus, a plurality of said bit map data are provided.

3. The input data processing device according to claim 1, wherein said bit map data includes at least a part of a first region corresponding to the position of one input region of said display image data, and, to a second region different in size from said one input region of said display image data, a value corresponding to said one input region is assigned.

4. The input data processing device according to claim 1, wherein in said bit map data, to a region matching the position of one input region of said display image data, a value corresponding to said one input region is assigned.

5. The input data processing device according to claim 1, further comprising an input unit for input of designation.

6. The input data processing device according to claim 1, wherein said predetermined apparatus is an image forming apparatus.

7. The input data processing device according to claim 6, wherein said plurality of input regions shown by said display image data represent a plurality of paper-supply trays respectively of said image forming apparatus.

8. The input data processing device of claim 1, comprising a control portion for determining, based on the output value, the component of the predetermined apparatus corresponding to the designated input region.

9. The input data processing device of claim 1, comprising a controller to which the position detecting portion and the output portion are included, wherein the predetermined apparatus is connected to the controller and each said input region corresponds to a different component of the predetermined apparatus.

10. A data processing method comprising the steps of:

displaying on a display unit, an image showing a plurality of input regions representing a range of acceptable inputs of designation, said designation being made for controlling a predetermined apparatus;

detecting a position designated by a user on said image displayed on said display unit;

referring to the designated position having been detected and to bit map data having different values assigned respectively to positions to be designated; and outputting the value corresponding to said designated position having been detected, according to said bit map data.

11. The data processing method according to claim 10, wherein for one piece of said predetermined apparatus, a plurality of said bit map data are provided, and in said referring step, one of said plurality of bit map data is referred to.

12. The data processing method according to claim 10, wherein said bit map data includes at least a part of a first region corresponding to the position of one input region of said image, and, to a second region different in size from said one input region of said image, a value corresponding to said one input region is assigned.

13. The data processing method according to claim 10, wherein in said bit map data, to a region matching the position of one input region of said image, a value corresponding to said one input region is assigned.

14. The data processing method according to claim 10, wherein said predetermined apparatus is an image forming apparatus, and said plurality of input regions shown by said image represent a plurality of paper-supply trays respectively of said image forming apparatus.

15. The data processing method of claim 10, comprising the step of determining, based on the output value, the component of the predetermined apparatus corresponding to a designated input region.

16. The data processing method of claim 10, wherein each said input region corresponds to a different component of the predetermined apparatus.

17. A computer program product for executing an input data process by a computer, said computer executing the process steps of:

displaying, on a display unit, an image showing a plurality of input regions representing a range of acceptable inputs of designation, said designation being made for controlling a predetermined apparatus;

detecting a position designated by a user on said image displayed on said display unit;

referring to the designated position having been detected and to bit map data having different values assigned respectively to positions to be designated; and outputting the value corresponding to said designated position having been detected, according to said bit map data.

18. The computer program product according to claim 17, wherein said computer program product is a computer program.

19. The computer program product according to claim 17, wherein said computer program product is a computer-readable storage medium on which a computer program is stored.

20. The computer program product of claim 17, said program further causing said computer to execute the step of determining, based on the output value, the component of the predetermined apparatus corresponding to a designated input region.

21. The computer program product of claim 17, wherein each said input region corresponds to a different component of the predetermined apparatus.

* * * * *